No. 851,281. PATENTED APR. 23, 1907.
J. C. DRAKE.
PLATE HOLDER.
APPLICATION FILED APR. 30, 1906.
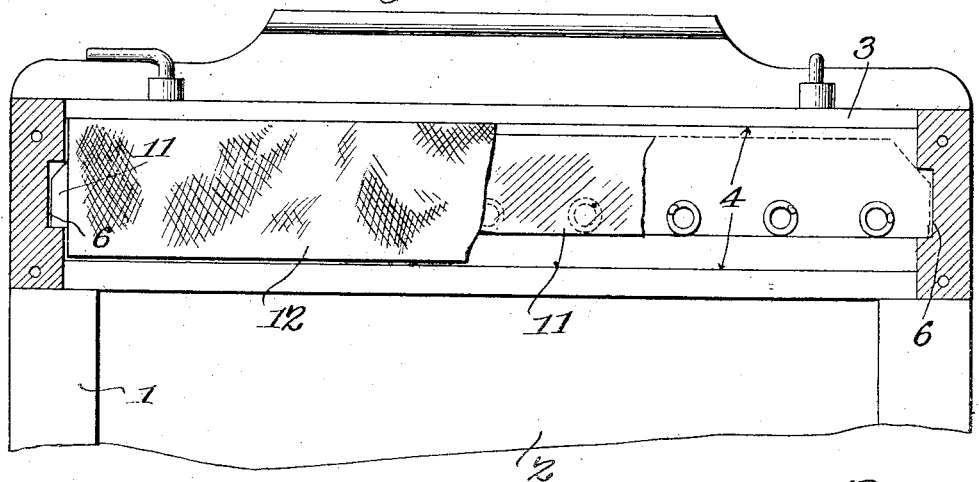
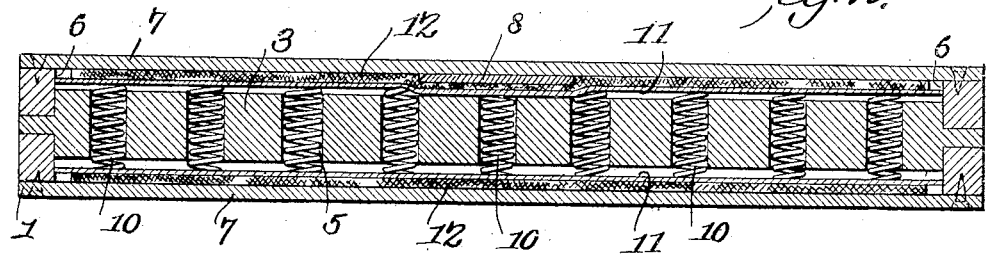
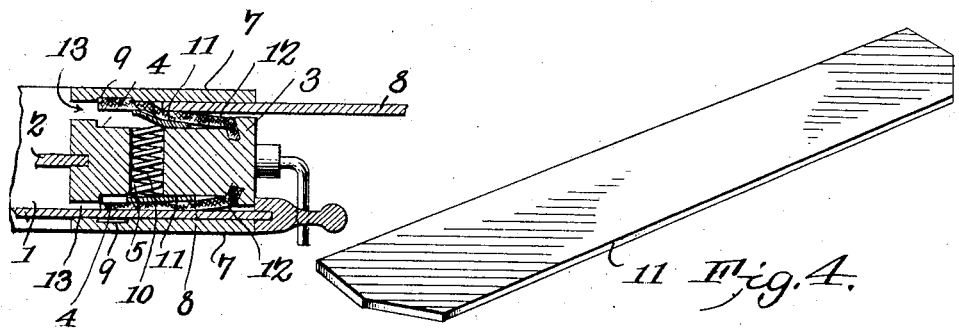
WITNESSES:
James C. Drake,
INVENTOR.
By C. A. Snow & Co.
ATTORNEYS

UNITED STATES PATENT OFFICE.

JAMES CHARLES DRAKE, OF ROCHESTER, MINNESOTA.

PLATE-HOLDER.

No. 851,281.  Specification of Letters Patent.  Patented April 23, 1907.

Application filed April 30, 1906. Serial No. 314,551.

*To all whom it may concern:*

Be it known that I, JAMES CHARLES DRAKE, a citizen of the United States, residing at Rochester, in the county of Olmsted and State of Minnesota, have invented a new and useful Plate-Holder, of which the following is a specification.

This invention relates to holders for photographic plates and more particularly to means for excluding light rays from the holder.

The object of the invention is to provide a holder of novel construction which will positively exclude light rays during the insertion of the slide even though said slide be placed within the holder corner first.

A still further object is to provide a light excluding device which is of very simple construction and which does not detract from the appearance of the holder.

With the above and other objects in view the invention consists of a holder having its front strip grooved longitudinally and provided with a plurality of openings in which are disposed coiled springs which exert an outward pressure upon a flexible strip having a cover of soft light excluding material such as felt. The shutter formed of these strips normally closes the opening formed within the front strip and as all of the springs constituting the supports for the holder contact with a continuous uninterrupetd strip of flexible material there is absolutely no possibility of light rays entering the shutter through the slide opening because said shutter will automatically clamp upon the slide even though the same be inserted corner first and will therefore prevent the formation of any space through which the light rays might pass.

The invention also consists of certain other novel features of construction and combinations of parts which will be hereinafter more fully described and pointed out in the claims.

In the accompanying drawings is shown the preferred form of the invention.

In said drawings: Figure 1 is a section showing the relative positions of the parts in the front strip of the holder; Fig. 2 is a longitudinal section through the front strip of the holder and showing in section the inserted corner of a slide; Fig. 3 is a transverse section through the front strip, one slide being shown entirely and the other partly inserted; and Fig. 4 is a detail of the flexible backing strip.

Referring to the figures by characters of reference, 1 is the frame of the holder having a partition 2 therein all portions except the front strip 3 of the frame being of the usual or any preferred construction. This strip has a broad groove 4 formed longitudinally in opposite faces thereof and the two grooves communicate through a plurality of apertures 5. The sides of the frame are recessed where they pass the ends of the grooves 4 as shown at 6 and support cap strips 7 which extend longitudinally of the grooves 4 and which are spaced from the strip 3 a sufficient distance to permit the insertion of slides 8. This cap strip is grooved longitudinally as shown at 9.

Mounted within each aperture 5 is a coiled spring 10 these springs bearing at their ends on flexible strips 11 preferably of celluloid and which are of slightly less width than the grooves 4 and long enough to project into the end recesses 6. Each of these strips 11 is overlapped by a soft flexible strip 12 of felt or other suitable light excluding material and this strip of felt is fastened along its front edge within the front portions of the groove 4 while its opposite edge is normally held projected by the springs 10 across the slot 13 formed between the front strip 3 and the cap strip 7. The width of the strip 12 is slightly less than the width of this groove 4 so that when the strips are pressed downward by the insertion of slide 8 they will be forced into the groove 4. The cap strips 7 of course prevent longitudinal displacement of the springs and the parts in contact therewith and said springs hold the free edges of the strips 12 normally seated in the grooves 9. Should a corner of the slide be inserted into the slot 13 only that portion of the strips 11 and 12 directly under it will be depressed and said corner will become partly imbedded within the strip 2 so that the edges of the slide will be overlapped thereby and light rays positively excluded. Importance is attached to the fact that the strip 11 is continuous from end to end and is not made up of connected tongues as heretofore because it has been found that by the use of a continuous flexible strip a much better lap by the shutter upon the slide can be effected. Importance is also attached to the fact that the ends of the strips extend through recesses upon the sides of the frame as by reason of these recesses there is no danger of light rays passing around the ends of the strips and said strips can not swing forward out of position within the slots. While I have shown and described this improved light excluding device in connection with a double plate holder it is to be understood that it can be used equally as well in a holder containing one plate at a time in which event recesses are substituted for the apertures 5. This change is so obvious that it is not deemed necessary to illustrate the same.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. In a plate holder a light excluding device for the slide, consisting of a continuous elongated flexible strip of hard material, a plurality of resilient supports therefor, and a soft flexible light excluding strip carried by the spring supported strip.

2. In a plate holder, a light excluding device for the slide comprising a soft flexible strip secured at one edge to the holder, supporting springs seated within the holder, and a continuous elongated flexible strip of hard material loosely interposed between the supports and the first mentioned strip and extending substantially the width of the holder.

3. In a plate holder, a light excluding device for the slide comprising a soft flexible strip permanently connected at one edge to the holder, a plurality of resilient supporting devices seated in alinement within the holder and a detached, flexible strip interposed between said resilient supports and the first mentioned strip and formed of a continuous imperforate hard material.

4. In a plate holder a light excluding device for the slide comprising soft flexible strips disposed upon opposite portions of the holder and secured thereto along one edge, detached flexible strips overlapping said first mentioned strips and formed of continuous imperforate hard material, and a plurality of resilient devices loosely mounted within the holder and bearing at their ends upon the detached strips.

5. In a plate holder the combination with a longitudinally grooved front strip having a plurality of openings therein; of a soft flexible strip secured along one edge and adapted to be entirely seated within the groove, resilient supporting devices seated within the openings, and continuous imperforate flexible means for distributing pressure from said devices to the strip.

6. The combination with a plate holder frame having a longitudinally grooved front strip, and recesses in the frame at the ends of said groove; of a soft, flexible strip secured, and adapted to be seated entirely within, the groove, the ends of said strip projecting into the recesses, resilient supporting devices seated within the front strip, and continuous imperforate flexible means for distributing pressure from said devices to the strip.

7. The combination with a plate holder having a longitudinally grooved front strip, and recesses in the sides of the holder at the ends of the groove; of a soft flexible strip secured along one edge, and adapted to be entirely seated, within the groove, said groove having a series of openings in the bottom thereof, resilient supporting devices seated within the openings, and a detached, and a continuous imperforate strip of hard flexible material interposed between said devices and the soft flexible strip, one of said strips projecting into the recesses.

In testimony that I claim the foregoing as my own, I have hereto affixed my signature in the presence of two witnesses:

JAMES CHARLES DRAKE.

Witnesses:
JOHN HALL,
LEONARD SEAMAN.